(12) United States Patent
Smith et al.

(10) Patent No.: US 9,342,303 B2
(45) Date of Patent: May 17, 2016

(54) MODIFIED EXECUTION USING CONTEXT SENSITIVE AUXILIARY CODE

(71) Applicant: Intel Corporation, Santa Clara, CA (US)

(72) Inventors: James E. Smith, Mesa, AZ (US); Denis M. Khartikov, San Jose, CA (US); Shiliang Hu, Los Altos, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 531 days.

(21) Appl. No.: 13/843,940

(22) Filed: Mar. 15, 2013

(65) Prior Publication Data

US 2014/0281382 A1 Sep. 18, 2014

(51) Int. Cl.
*G06F 9/30* (2006.01)
*G06F 9/45* (2006.01)

(52) U.S. Cl.
CPC . *G06F 9/30* (2013.01); *G06F 8/443* (2013.01)

(58) Field of Classification Search
CPC combination set(s) only.
See application file for complete search history.

(56) References Cited

U.S. PATENT DOCUMENTS

| | | | |
|---|---|---|---|
| 4,266,272 A | 5/1981 | Berglund et al. | |
| 4,336,602 A | 6/1982 | Kruger | |
| 4,864,535 A | 9/1989 | Rogers et al. | |
| 5,748,981 A | 5/1998 | Patchen et al. | |
| 5,764,994 A | 6/1998 | Craft | |
| 6,263,429 B1 | 7/2001 | Siska | |
| 6,339,788 B1 | 1/2002 | Geyer et al. | |
| 6,721,276 B1 | 4/2004 | Kher et al. | |
| 7,451,121 B2 | 11/2008 | Wu et al. | |
| 7,526,638 B1* | 4/2009 | Handlogten | G06F 9/223 712/226 |
| 7,734,895 B1* | 6/2010 | Agarwal | G06F 8/52 712/13 |
| 7,873,814 B1* | 1/2011 | Cohen | G06F 9/30134 712/209 |
| 8,427,952 B1 | 4/2013 | Pearce | |
| 8,689,190 B2* | 4/2014 | DeWitt, Jr. | G06F 11/3409 717/127 |
| 2002/0029329 A1 | 3/2002 | Cho | |
| 2002/0091912 A1 | 7/2002 | George et al. | |
| 2005/0086650 A1* | 4/2005 | Yates, Jr. | G06F 9/45533 717/139 |
| 2005/0114635 A1 | 5/2005 | Cho | |
| 2005/0128114 A1 | 6/2005 | Case et al. | |
| 2005/0155022 A1* | 7/2005 | DeWitt, Jr. | G06F 11/3612 717/131 |
| 2006/0002707 A1 | 1/2006 | Ekkizogloy et al. | |
| 2006/0002710 A1 | 1/2006 | Dybsetter et al. | |
| 2006/0093366 A1 | 5/2006 | Hahin et al. | |
| 2007/0074199 A1 | 3/2007 | Schoenberg | |
| 2009/0300238 A1 | 12/2009 | Panabaker et al. | |
| 2010/0274972 A1 | 10/2010 | Babayan et al. | |
| 2012/0233477 A1* | 9/2012 | Wu | G06F 1/3287 713/320 |

* cited by examiner

*Primary Examiner* — Eric Coleman
(74) *Attorney, Agent, or Firm* — Trop, Pruner & Hu, P.C.

(57) ABSTRACT

A system and method to enhance execution of architected instructions in a processor uses auxiliary code to optimize execution of base microcode. An execution context of the architected instructions may be profiled to detect potential optimizations, resulting in generation and storage of auxiliary microcode. When the architected instructions are decoded to base microcode for execution, the base microcode may be enhanced or modified using retrieved auxiliary code.

23 Claims, 7 Drawing Sheets

MODIFIED EXECUTION USING CONTEXT SENSITIVE AUXILIARY CODE

TECHNICAL FIELD

Embodiments described herein generally relate to processor microarchitecture, and in particular, to energy efficient high performance microarchitecture.

BACKGROUND

In a conventional processor, instruction-generated control signals are encoded as microcode and are produced in a context-free manner. A conventional processor may, for occurrences of a specific architected instruction, generate the same microcode regardless of neighboring instructions or patterns that may be exhibited by data associated with the instruction.

DESCRIPTION OF EMBODIMENTS

Figure 1:
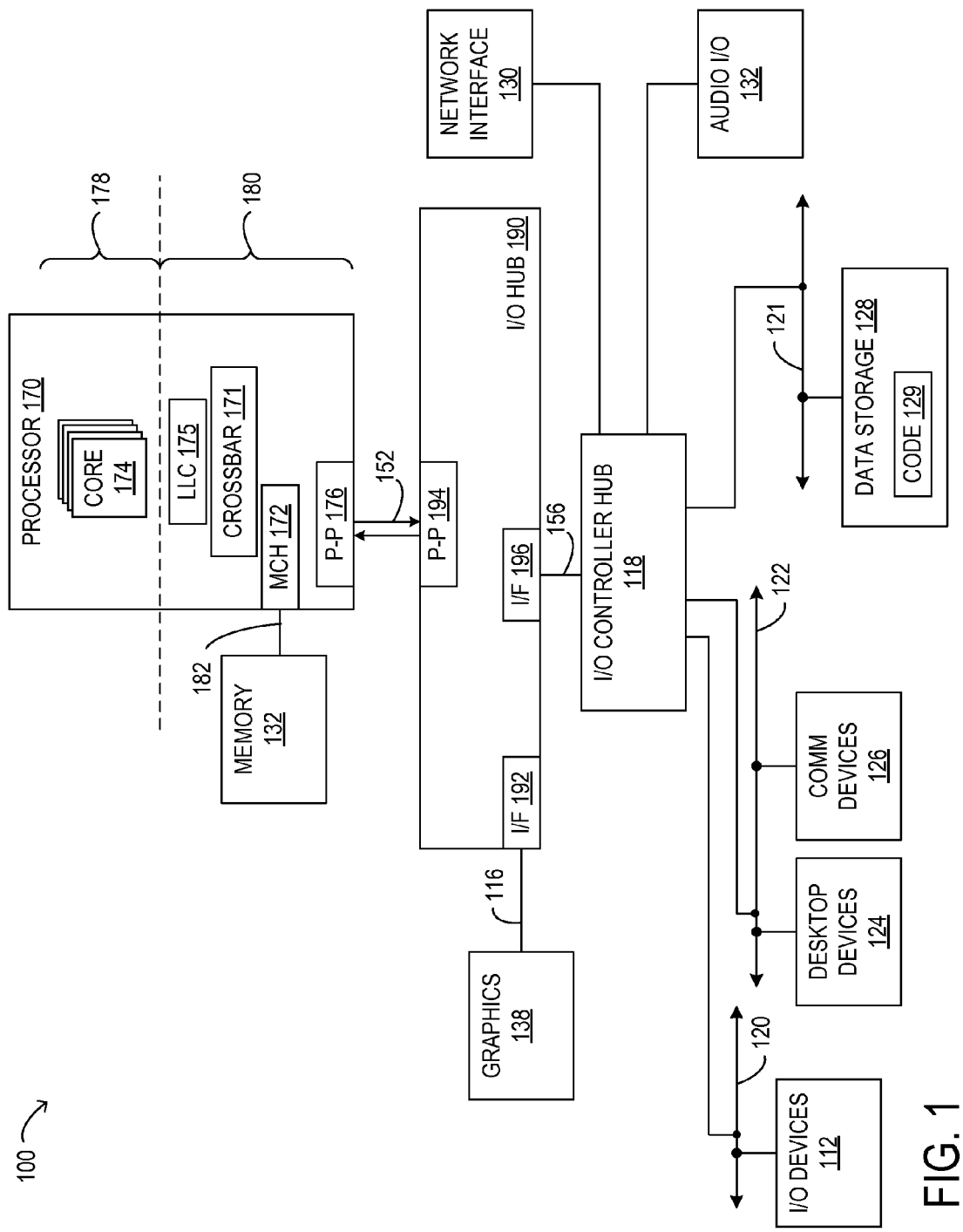
FIG. 1 illustrates a computer system used in conjunction with at least one embodiment.

In at least one embodiment, existing microcode is enhanced with auxiliary microcode, referred to herein simply as auxiliary code, which provides additional control information. The use of auxiliary code combines, in some embodiments, certain advantages of both a hardware approach and a software approach to context-based optimizations. A hardware approach to context based optimization generally includes the use of a hardware analyzer/predictor to recognize repeating patterns in instructions and/or data, to perform analysis in hardware, to predict when an optimization should be enabled, and to produce the hardware control signals which implement the given optimization. Generally, when a hardware approach to context based optimization is undertaken, some type of recovery/replay hardware may also be required because the context predictor may not always be correct. Issues generally associated with a hardware approach to context based optimization arise as a result of the optimizations being complex and the speculation involved being relatively inaccurate. These issues may diminish any performance benefits realized. A software approach to context based optimization generally includes the use of a software translator/optimizer to analyze context information in the code and to generate new, optimized, context-sensitive code using a different architected instruction set to achieve desired improvements. Generally, the new instruction set and new microcode may further need to be co-designed with the hardware to implement the desired optimizations with a virtual machine (VM). Issues generally associated with a software approach or binary translation to context based optimization include the requirement to implement an entirely new instruction set and microarchitecture, including new microcode. Additional issues may arise because of the requirement to maintain architecture compatibility with the original instruction. Some of these issues may result in slow response times due to interpretation or inefficient translation of the different instruction set.

In some embodiments, auxiliary code may, as in a hardware only approach, maintain an original architected instruction set and microcode for driving functional execution, and may use the architected instruction pointer (IP) to fetch instructions from the original architected instructions, which can be executed upon startup without modification. Using the architected IP, in some embodiments, also provides the advantage that existing interrupt handling mechanisms may be usable without modification with auxiliary code. Other embodiments, using auxiliary code, may be able to rollback and recover from an instruction-generated exception condition.

In some embodiments, the context information used to improve microcode execution includes: (i) if a result produced by one instruction has only one consuming instruction, the hardware may skip writing the result to a separate register and then reading the result from the register and (ii) if a result of an instruction has no consumers along a most frequently taken execution path, the instruction may be removed or converted to a no-op whenever the frequent execution path is taken.

In at least one embodiment, a code optimization method includes identifying, as a hotspot, code sequences in architected instructions appearing with a frequency exceeding a hotspot threshold, and analyzing an execution context of the hotspot to identify a potential optimization of base microcode corresponding to the hotspot. At least one embodiment of the method includes generating auxiliary code associated with the potential optimization, and storing the auxiliary code.

Is some embodiments, the method includes retrieving auxiliary code associated with the potential optimization and blending base microcode and the auxiliary code retrieved to produce enhanced microcode. The base microcode for an architected instruction may specify a base execution of an architected instruction in some embodiments. In some embodiments, the enhanced microcode may specify a modified execution for the architected instruction.

In at least one embodiment, the blending includes appending auxiliary code to the base microcode. The auxiliary code and the base microcode may be maintained in separate memory regions in some embodiments. The blending may include invoking a jump table to synchronize sequencing of the auxiliary code in some embodiments. In at least one embodiment, operands in the modified execution may differ from operands in the base execution. In some embodiments, a number of operands in the modified execution may differ from a number of operands in the base execution; a function performed by the modified execution may differ from a function performed by the base execution; and/or a number of functions performed by the modified execution may differ from a number of functions performed by the base execution. The method operation of analyzing the execution context may, in some embodiments, include storing contextual information describing prior executions of the hotspot. In some embodiments, the contextual information may include information indicating a likelihood of a branch path, may include information indicating a likelihood of an operand referencing a hardware structure, may include information indicating a likelihood of an operand referencing a memory address, may include information indicating a likelihood of an operand storing a given value, and may include information indicating a frequency of consumption of a result of an instruction.

In at least one embodiment, a processor includes a computer readable storage medium accessible to the processor and storing processor executable instructions. The processor executable instructions may profile code sequences of architected instructions to detect hotspots appearing more frequently than a hotspot threshold, and analyze an execution context of a hotspot included in the hotspots detected to identify a potential optimization corresponding to the hotspot. The processor executable instructions may, in some embodiments, further be to generate auxiliary code associated with the potential optimization, and store the auxiliary code. In at least one embodiment, the instructions to analyze the execution context may include instructions to store contextual information describing prior executions of the hotspot.

In at least one embodiment, the processor executable instructions may retrieve the auxiliary code associated with the potential optimization, and blend base microcode with the auxiliary code retrieved to produce enhanced microcode. The base microcode for an architected instruction may, in some embodiments, specify a base execution of the architected instruction, while the enhanced microcode may specify an enhanced execution for the architected instruction.

In some embodiments, the base execution may consumer more power and/or operate slower compared to the enhanced execution. In other embodiments, the processor may operate at lower performance when implementing the base execution compared to implementing the enhanced execution.

In at least one embodiment, a system includes a processor including a first core and a memory accessible to the processor. In some embodiments, the first core may include instructions executable by the first core to profile code sequences of architected instructions to detect hotspot code appearing more frequently than a hotspot threshold, and analyze an execution context of the hotspot code to identify a potential optimization of the hotspot code. In some embodiments, the first core may further include instructions executable by the first core to generate auxiliary code associated with the potential optimization, and store the auxiliary code.

In at least one embodiment, the first core may retrieve the auxiliary code associated with the potential optimization and blend base microcode with the auxiliary code retrieved to produce enhanced microcode. The base microcode for an architected instruction may, in some embodiments, specify a base execution of the architected instruction, while the enhanced microcode may specify an enhanced execution for the architected instruction.

In some embodiments, the first core may include a jump table that indexes hotspot code to corresponding auxiliary code, and a jump translation lookaside buffer to cache entries in the jump table. In at least one embodiment, the first core may include an auxiliary code handler to blend the base microcode with the auxiliary code. The first core may, in some embodiments, include a base microcode store and an auxiliary code store.

In the following description, details are set forth in conjunction with embodiments to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, widget 12-1 refers to an instance of a widget class, which may be referred to collectively as widgets 12 and any one of which may be referred to generically as a widget 12.

Embodiments may be implemented in many different system types. FIG. 1 illustrates a computer system used in conjunction with at least one embodiment. In at least one embodiment, processors, memory, and input/output devices are interconnected by a number of point-to-point (P-P) interfaces, as will be described in further detail. However, in other embodiments the processor system may employ different bus architectures, such as a front side bus, a multi-drop bus, and/or another bus architecture. Although one processor is included in some embodiments, other embodiments may include two or more processors.

In at least one embodiment, processor system 100 is a point-to-point interconnect system, and includes processor 170. In some embodiments, processor 170 is a multi-core processor including a plurality of cores 174, which may vary in number in individual implementations, as desired. In at least one embodiment, a portion of processor 170 including cores 174 may be referred to as core portion 178, while a portion of processor 170 including other elements, yet excluding cores 174, may be referred to as uncore portion 180. In some embodiments, a varying number of cores may be present in a particular processor. Cores 174 may, in some embodiments, comprise a number of sub-elements (not shown in FIG. 1), also referred to as clusters, that provide different aspects of overall functionality. In at least one embodiment, cores 174 may each include a memory cluster (not shown in FIG. 1) that may comprise one or more levels of cache memory. Other clusters (not shown in FIG. 1) in cores 174 may include a front-end cluster and an execution cluster in some embodiments.

In some embodiments, cores 174 may include internal power monitoring and power regulation ability and may also communicate directly with each other. In particular embodiments, cores 174 within processor 170 may communicate with each other via crossbar 171, which may include intelligent functionality such as cache control, data queuing, P-P protocols, and multi-core interfacing. Cache controller functionality, whether located within crossbar 171 or elsewhere may, in some embodiments, enable selective caching of data within a cache hierarchy including LLC 175 and/or one or more caches present in cores 174.

In at least one embodiment, LLC 175 may be coupled to processor cores 174 respectively. In at least one embodiment, LLC 175 may be shared by cores 174. In some embodiments, LLC 175 may be fully shared such that any single one of cores 174 may fill or access the full storage capacity of LLC 175. Additionally, in some embodiments, MCH 172 may provide for direct access by processor 170 to memory 132 via memory interface 182. In at least one embodiment, memory 132 may be a double-data rate (DDR) type dynamic random-access memory (DRAM) while memory interface 182 and MCH 172 comply with a DDR interface specification. Memory 132 may, in some embodiments, represent a bank of memory interfaces (or slots) that may be populated with corresponding memory circuits for a desired DRAM capacity.

In at least one embodiment, processor 170 may also communicate with other elements of processor system 100, such as I/O hub 190 and I/O controller hub 118, which are also collectively referred to as a chipset that supports processor 170. P-P interface 176 may, in some embodiments, be used by processor 170 to communicate with I/O hub 190 at P-P interface 194 via interconnect link 152.

In at least one embodiment, I/O hub 190 includes interface 192 to couple I/O hub 190 with first bus 116, which may support high-performance graphics and/or video output to corresponding bus devices, such as graphics 138. In some embodiments, graphics 138 may represent a high-performance graphics engine that outputs to a display device (not shown in FIG. 1). In one embodiment, first bus 116 is a Peripheral Component Interconnect (PCI) bus, such as a PCI Express (PCIe) bus and/or another computer expansion bus or interface. I/O hub 190 may also be coupled to I/O controller hub 118 at south bridge interface 196 via interconnect link 156 in some embodiments. In at least one embodiment, I/O controller hub 118 may provide I/O interconnections for various computer system peripheral devices and interfaces and may provide backward compatibility with legacy computer system peripheral devices and interfaces. In some embodiments, I/O controller hub 118 is shown providing network interface 130 and audio I/O 132, as well as providing interfaces to second bus 120, third bus 122, and fourth bus 121, as will be described in further detail.

In some embodiments, second bus 120 may support expanded functionality for microprocessor system 100 with I/O devices 112, and may be a PCI-type computer bus. In some embodiments, third bus 122 may be a peripheral bus for end-user consumer devices, represented by desktop devices 124 and communication devices 126, which may include various types of keyboards, computer mice, communication devices, data storage devices, bus expansion devices, etc. In certain embodiments, third bus 122 represents a Universal Serial Bus (USB) or similar peripheral interconnect bus. Fourth bus 121 may, in some embodiments, represent a computer interface bus for connecting mass storage devices, such as hard disk drives, optical drives, or disk arrays, which are generically represented by data storage 128, shown including code 139 that may be executable by processor 170.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Figure 2A:
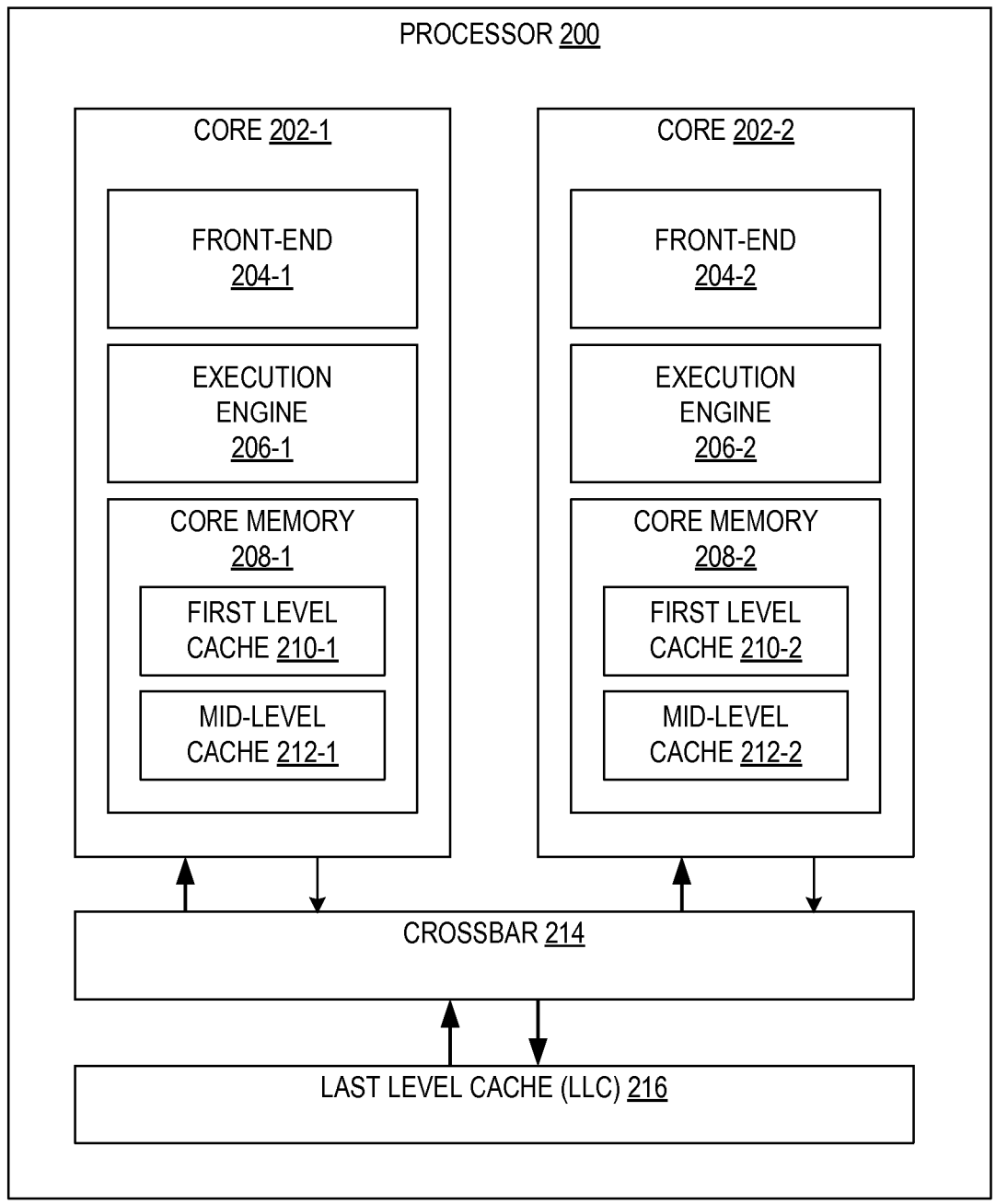
FIG. 2A illustrates a processor used in conjunction with at least one embodiment.

FIG. 2A illustrates a processor used in conjunction with at least one embodiment. In at least one embodiment, processor 200 is a multi-core processor including a plurality of processor cores 202. In some embodiments, processor 200 includes first core 202-1 and second core 202-2, whose internal components are individually referenced in FIG. 2A using like element numbers ending in -1 and -2, respectively. In some embodiments, other elements of processor 200 besides cores 202 may be referred to as an uncore. In at least one embodiment, two cores may be include. In other embodiments, a different number of cores may be employed using elements of the illustrated architecture. In some embodiments, cores 202 may comprise a number of sub-elements, also referred to as clusters, that provide different aspects of overall functionality. In at least one embodiment, cores 202 may each include front-end 204, execution engine 206, and core memory 208.

In at least one embodiment, front-end 204 may be responsible for fetching instruction bytes and decoding those instruction bytes into micro-operations that execution engine 206 and/or core memory 208 consume in the form of microcode. Thus, front-end 204 may be responsible for ensuring that a steady stream of microcode is fed to execution engine 206 and/or core memory 208 in some embodiments. Execution engine 206 may, in some embodiments, be responsible for scheduling and executing microcode and may include buffers for reordering micro-operations in microcode and a number of execution ports (not shown in FIG. 2A). In at least one embodiment, core memory 208 may include multiple levels of a cache hierarchy. Specifically, in some embodiments, core memory 208 may include first level cache 210. In one embodiment, first level cache 210 may correspond to an L1 cache. Core memory 208 may, in some embodiments, further include mid-level cache 212. Mid-level cache 212 may correspond to an L2 cache in some embodiments.

In particular embodiments, first core 202-1 and second core 202-1 within processor 200 are not equipped with direct means of communicating with each other, but rather, communicate via crossbar 214, which may include intelligent functionality such as cache control, data queuing, P-P protocols, and multi-core interfacing. Crossbar 214 may thus represent an intelligent uncore controller that interconnects cores 202 with LLC 216, among other elements (not shown) of processor 200 in some embodiments.

In at least one embodiment, processor 200 includes LLC 216, which may be a higher-level cache that operates in conjunction with first level cache 210 and mid-level cache 212. Thus, first level cache 210, mid-level cache 212, and LLC 216 may represent a cache hierarchy in some embodiments. During operation, memory requests from execution engine 206-1 may first access first level cache 210 before looking up any other caches within a system in some embodiments. Accordingly, in some embodiments, for improved performance, frequently accessed data may be present in the lowest possible cache level, i.e., first level cache 210. When the requested data is not present in first level cache 210, mid-level cache 212 may, in some embodiments, next be accessed to determine if the requested data is currently stored in mid-level cache 212. In at least one embodiment, mid-level cache 212 may be a final lookup point for each core 202 before a request is issued to LLC 216, which is a shared cache among cores 202.

Figure 2B:
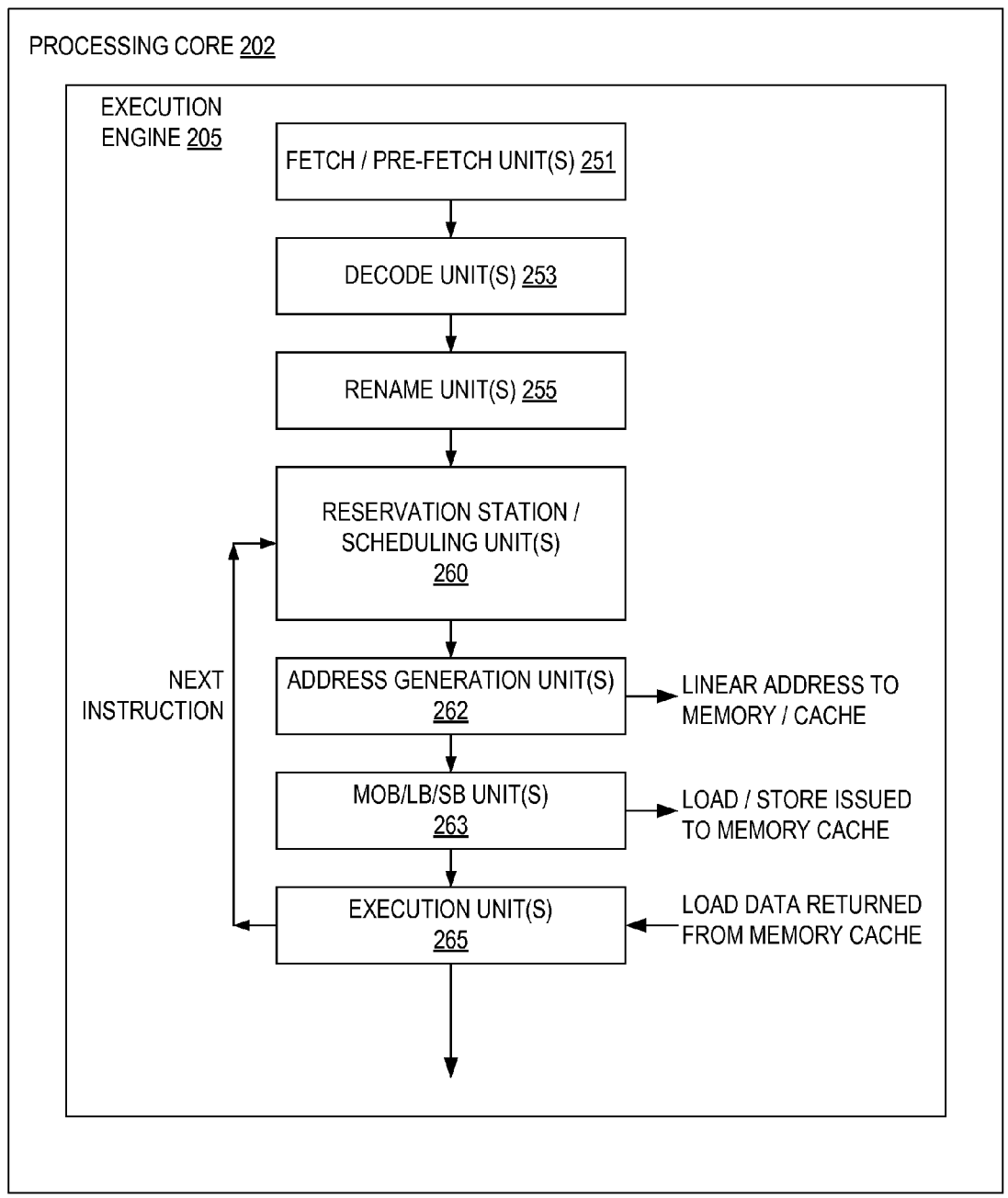
FIG. 2B illustrates a processor used in conjunction with at least one embodiment.

FIG. 2B illustrates an out-of-order execution core. In one embodiment, execution core 205 includes all or some of the elements of front end 204 and execution engine 206 of processing core 202. In at least one embodiment, pending loads may be speculatively issued to a memory address before other older pending store operations according to a prediction algorithm, such as a hashing function. In at least one embodiment, execution core 205 includes a fetch/prefetch unit 251, a decoder unit 253, one or more rename units 255 to assign registers to appropriate instructions or micro-ops, and one or more scheduling/reservation station units 260 to store microops corresponding to load and store operations (e.g., STA micro-ops) until their corresponding target addresses source operands are determined. In some embodiments an address generation unit 262 to generate the target linear addresses corresponding to the load and stores, and an execution unit 265 to generate a pointer to the next operation to be dispatched from the scheduler/reservation stations 260 based on load data returned by dispatching load operations to memory/cache are also included. In at least one embodiment, a memory order buffer (MOB) 263, which may contain load and store buffers to store loads and stores in program order and to check for dependencies/conflicts between the loads and stores is included. In one embodiment, loads may be issued to memory/cache before older stores are issued to memory/cache without waiting to determine whether the loads are dependent upon or otherwise conflict with older pending stores. In other embodiments, processor 270 is an in-order processor.

Figure 3:
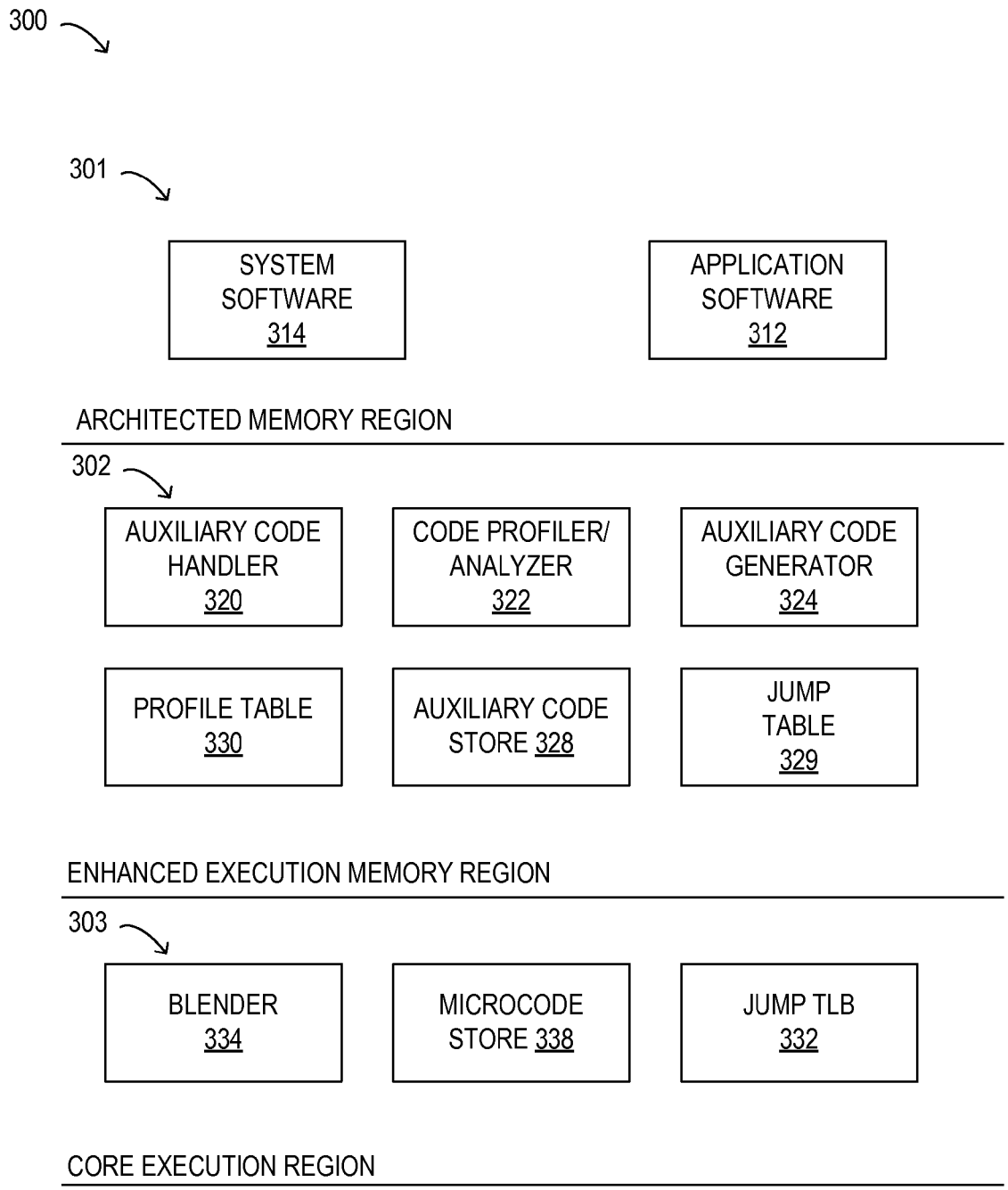
FIG. 3 illustrates one embodiment of an execution architecture.

FIG. 3 illustrates one embodiment of an execution architecture. In at least one embodiment, enhanced execution architecture 300 illustrates elements that may be used to implement auxiliary code in a processor, as described herein. In some embodiments, enhanced execution architecture 300 may leverage binary translation technology, but does not literally translate from one executable binary to another. Rather, enhanced execution architecture 300 may, in some embodiments, be usable to append optimization information contained in auxiliary code to base microcode to generate enhanced (or modified) microcode, as will be described in further detail.

In at least one embodiment, enhanced execution architecture 300 illustrates various regions within a processor, including a first memory region referred to herein as architected memory region 301, a second memory region referred to herein as enhanced execution memory region 302, and a core execution region 303. Architected memory region 301 may, in some embodiments, represent a conventional memory space to store system software 314 and application software 312, which represent a source of architected instructions for execution. In certain embodiments, architected memory region 301 may represent a physical memory space, such as within a random-access memory. Enhanced execution memory region 302 may, in some embodiments, represent another memory space to store auxiliary code or to otherwise implement functionality associated with auxiliary code, as described herein. In certain embodiments, enhanced execution memory region 302 may be include a hidden and/or concealed memory space, within a core of a processor, such that functionality encompassed by enhanced execution region 302 may be performed without external intervention. Thus, auxiliary code in enhanced execution memory region 302 may, in some embodiments, be transparent to system software 314 and/or application software 312, which may remain unaware of optimizations realized using auxiliary code.

In some embodiments, enhanced execution memory region 302 includes auxiliary code handler 320, which may represent a runtime handler that is invoked when auxiliary code optimizations are initiated by a micro-trap in profile table 330. Different from a runtime manager in a conventional VM, however, auxiliary code handler 320 may not, in some embodiments, be in complete control of instruction execution processes and may act as a slave under command of architected instruction execution (i.e., base execution) rather than a master. Accordingly, the instruction execution processes may be configured to switch back and forth between base execution (without auxiliary code) and enhanced (or modified) execution (with auxiliary code) without runtime intervention in some embodiments. Since the instruction execution processes are compatible with the architected instruction pointer, existing interrupt handling mechanisms may, in some embodiments, be used without modification of underlying hardware.

In some embodiments, in enhanced execution architecture 300, auxiliary code may be fetched in parallel with code for the architected instruction set that is fetched from architected memory region 301 and decoded to base microcode using microcode store 338 in core execution region 303. However, the auxiliary code may, in some embodiments, be fetched from auxiliary code store 328 where the auxiliary code is held in a logically separate memory space than architected memory region 301. Accordingly, jump table 329 and jump translation lookaside buffer (TLB) 332 in enhanced execution memory region 302 and in core execution region 303 may represent structures for synchronizing the sequencing of auxiliary code with sequences of base microcode in some embodiments. In some embodiments, auxiliary code and conventional architected instruction set code may reside in two different address spaces. In certain embodiments, auxiliary code may reside in a concealed region of memory, while the architected instructions are in an architected region of memory. A direct correspondence may exist between a region of auxiliary code and certain architected instructions in some embodiments. During enhanced execution in some embodiments, after the correspondence is established, execution continues with the architected instruction control flow guiding the corresponding flow of auxiliary code fetches. There may be instances, however, when the correspondence is lost and must be re-established in some embodiments. One such instance may be when the architected instruction code takes an indirect jump to an address held in a register. Another instance may be when the architected instruction code is executing in base execution, but then jumps to enhanced execution when a region of architected instruction code for which auxiliary code already exists is identified (see also FIG. 5).

In some embodiments, jump table 329 may represent a data structure held in memory under control of auxiliary code handler 320. Jump table 329 may, in some embodiments, contain entries for architected instruction sequences that may be enhanced using auxiliary code. To reference entries, jump table 329 may include pairs of architected IP and auxiliary IP addresses in some embodiments. In at least one embodiment, jump table 329 may be accessed using an architected IP value to output a corresponding auxiliary IP. In some embodiments, no auxiliary IP may be present for a given architected IP value. In some embodiments, jump table 329 may be implemented in software. However, a software embodiment of jump table 329 may not be sufficiently fast for code execution in a processor, where low latency operations are important for performance. Therefore, jump TLB 332 in core execution region 303 is used, in some embodiments, as a cache-like hardware structure that contains recently used entries in jump table 329 and is accessible from an instruction pipeline. The contents of jump table 329 and/or jump TLB 332 may, in some embodiments, be managed by auxiliary code handler 320.

In operation, during enhanced execution, indirect jump targets may, in some embodiments, index into jump TLB 332. In addition, during base execution, potential start point addresses may also access the jump TLB 332 in some embodiments. When a hit occurs in jump TLB 332, then the auxiliary IP may be used to fetch corresponding auxiliary code in some embodiments. In some embodiments, when a miss occurs in jump TLB 332, execution may proceed in base execution without using auxiliary code. Auxiliary code handler 320 may update jump TLB 332 by copying entries from jump table 329 to jump TLB 332 as needed, in some embodiments, by replacing less recently used entries with newer entries.

In at least one embodiment, code profiler/analyzer 322 and profile table 330 are included in enhanced execution memory region 302. Profile table 330 may, in some embodiments, represent a structure that supports dynamic profiling to identify hotspots in the architected instructions and may also assist with managing jump TLB 332. As used herein, "profiling" refers to analyzing architected instructions to detect hotspots, which are regions of code that may be subject to optimization using auxiliary code. In some embodiments, profile table 330 may store a counter value for each of a respective plurality of architected IP addresses. In at least one embodiment, it may be found that hotspot regions typically start at jump destination addresses; therefore, architected IP addresses that correspond to targets of branch/jump instructions may be selected for storing in profile table 330, which may be associatively addressed in a similar manner as a cache memory. During base execution, as architected instructions are retired, certain architected IP addresses (i.e., corresponding to architected instructions that may be optimized using auxiliary code) may be stored to profile table 330 in some embodiments. When a profiled instruction results in a hit at a previously stored location (i.e., entry or row) in profile table 330, then a counter value at the location in profile table 330 may be incremented in some embodiments. When a profiled instruction results in a miss in profile table 330, a new entry may be allocated into profile table 330 in some embodiments. In some embodiments, a finite number of entries in profile table 330 may be maintained by evicting one of the existing entries using a least recently used algorithm. Other embodiments of profile table 330, such as a multiple level cache arrangement similar to using jump table 329 with jump TLB 332, may also be used. In at least one embodiment, blender 334 may synchronize a stream of base microcode with a stream of auxiliary code to generate enhanced microcode.

Figure 4:
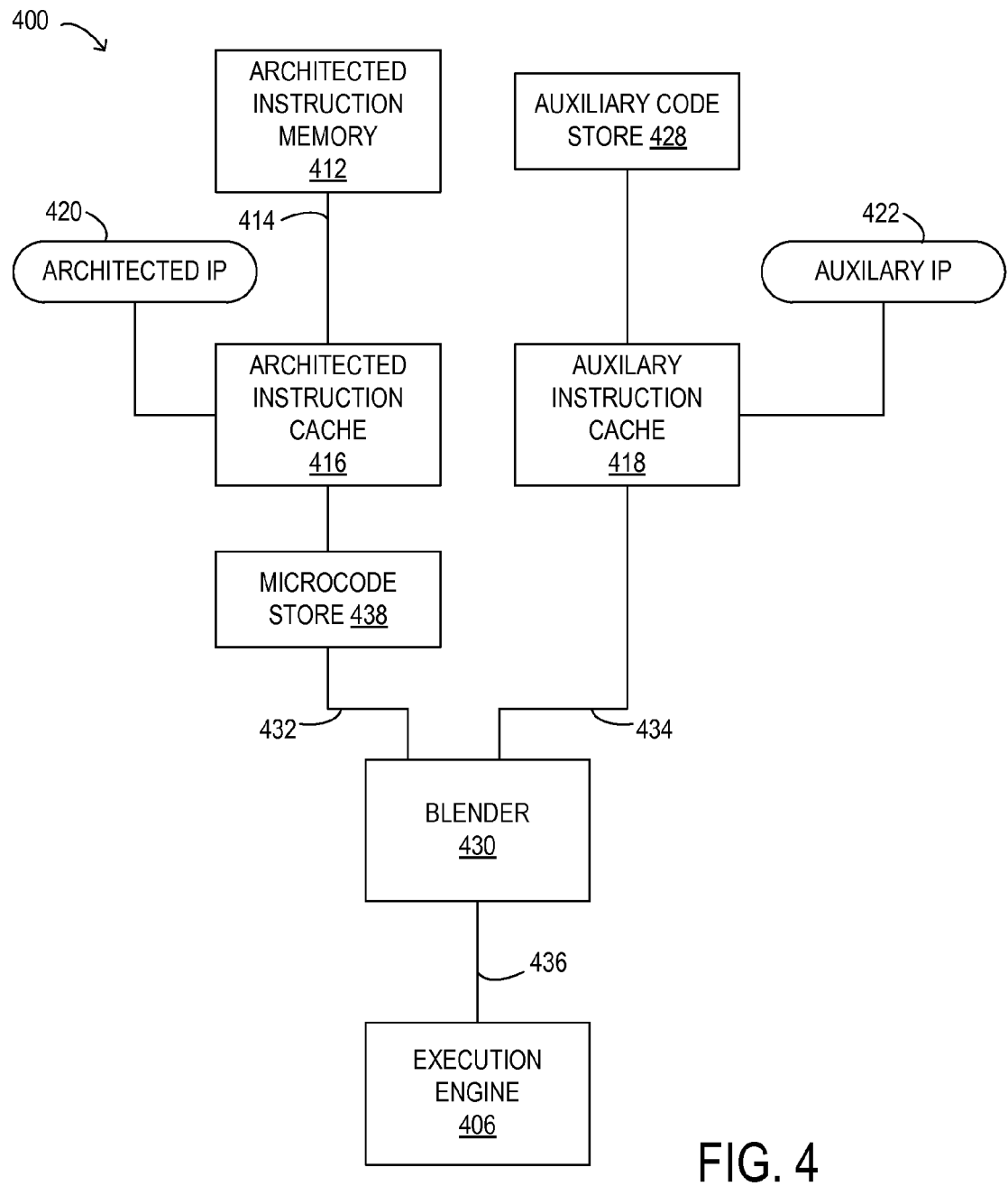
FIG. 4 illustrates an execution engine used in conjunction with at least one embodiment.

FIG. 4 illustrates an execution engine used in conjunction with at least one embodiment. In at least one embodiment, enhanced execution system 400 illustrates elements that may be used to generate and execute auxiliary code in a processor, as described herein. In some embodiments, architected instruction memory 412 holds architected instructions 414 for execution that are loaded into architected instruction cache 416, where architected instructions 414 may be fetched via the architected IP 420. In some embodiments, architected instructions include Intel64 (Intel Corp.) and AMD64 (Advanced Micro Devices, Inc.), which are 64-bit versions of x86 processor instructions sets. Architected instructions 414, referenced by architected IP 420, may then, in some embodiments, be decoded by accessing microcode store 438 to generate base microcode 432. Also, in some embodiments, auxiliary IP 422 may access auxiliary code store 428 and populate auxiliary instruction cache 418 with auxiliary code 434. In certain embodiments, auxiliary code store 428 may reside in a concealed region of physical memory (not shown). A stream of auxiliary code 434 may then, in some embodiments, be synchronized at blender 430 with base microcode 432 to form enhanced microcode 436. In some embodiments, blending, as performed by blender 430, may represent specific code-dependent operations rather than just a simple merging of bits.

In at least one embodiment, blender 430 may be configured to modify functions and/or operands, and to add new functions and/or operands, as desired, which result in enhanced microcode 436 that is optimized. Thus, optimizations performed by blender 430 using base microcode 432 and auxiliary code 434 may, in some embodiments, be based on contextual information describing an execution context of corresponding architected instructions 414. In some embodiments, the contextual information may be gleaned by dynamic profiling and software analysis of code sequences of architected instructions 414 as they reside in architected instruction memory 412. In at least one embodiment, the contextual information may include: information indicating a likelihood of a branch path; information indicating a likelihood of an operand referencing a hardware structure; information indicating a likelihood of an operand referencing a memory address; information indicating a likelihood of an operand storing a given value; and/or information indicating a frequency of consumption of a result of an instruction.

In some embodiments, blender 430 may further dispatch enhanced microcode 436 to execution engine 406 for execution. Execution engine 406 may, in some embodiments, represent an embodiment of execution engine 206 in core 202 (see FIG. 2A). In some embodiments, a microarchitecture of execution engine 406 may be specifically designed with special hardware on which enhanced microcode 436 may be executed, a form of execution referred to herein as an enhanced (or a modified) execution of architected instructions 414. In the absence of auxiliary code 434 and/or enhanced microcode 436, enhanced execution system 400, including execution engine 406, may, in some embodiments, be configured to execute base microcode 432 without modifications, referred to herein as a base execution of architected instructions 414.

In some embodiments, even though auxiliary code 434 may be capable of significantly transforming base microcode 432, auxiliary code 434 may require a relatively small number of additional symbols (e.g., bits), because base microcode 432 may already include the necessary information to execute functionality specified by architected instructions 414. Therefore, in certain embodiments, auxiliary code 434 may include additional optimization information for particular instances of architected instructions 414. In some embodiments, certain optimizations may involve a small number of additional bits of auxiliary code 434. In at least one embodiment, auxiliary code 434 requires a maximum of three additional bytes of data per operation of base microcode 432 to support a desired optimization.

In certain embodiments, a one-one relationship may exist between certain ones of architected instructions 414 and auxiliary code 434, in that an instance of architected instructions 414 may be decoded to a single operation in base microcode 432, to which a single operation in auxiliary code 434 corresponds. In various embodiments, an instance of architected instructions 414 may be decoded to multiple operations in base microcode 432 so that multiple auxiliary codes 434 may correspond to a single architectural instruction 414. Auxiliary code 434 may conform to a desired encoding format in some embodiments. In at least one embodiment, the encoding format may be a fixed-length encoding format to facilitate ease of decoding in hardware. While auxiliary code 434 may specify branch target addresses, in some embodiments, branch outcomes and/or branch predictions may continue to be generated by conventional microcode handling processes. By including auxiliary code targets as well as instruction set targets in a branch target buffer, sequencing of auxiliary code 434 may be further expedited in some embodiments.

In at least one embodiment, auxiliary code store 428 may be held in memory and managed by corresponding software (not shown). In some embodiments, auxiliary code store 428 may contain auxiliary code 434 organized into regions that may correspond to basic blocks, superblocks, and/or another type of code region that may be linked together by branch operations. In at least one embodiment, region formation may begin when a profiling mechanism (such as code profiler/analyzer 322, see FIG. 3) identifies the beginning, or start point, of a sequence of frequently executed code. In some embodiments, code profiler/analyzer 322 and auxiliary code generator 324 (see FIG. 3) may then produce auxiliary code 434 for the identified region.

In at least one embodiment, one advantage of enhanced execution system 400 is the use of architected IP 420 for referencing executed instructions, which is compatible with base execution and enhanced execution, thereby eliminating a number of potential issues that arise with other methods, such as binary translation, that use a non-architected IP. In some embodiments, architected IP 420 is compatible with architected handling of page faults, target addresses, return addresses, relative addresses, and runtime exceptions, which may not be the case for a non-architected IP.

Figure 5:
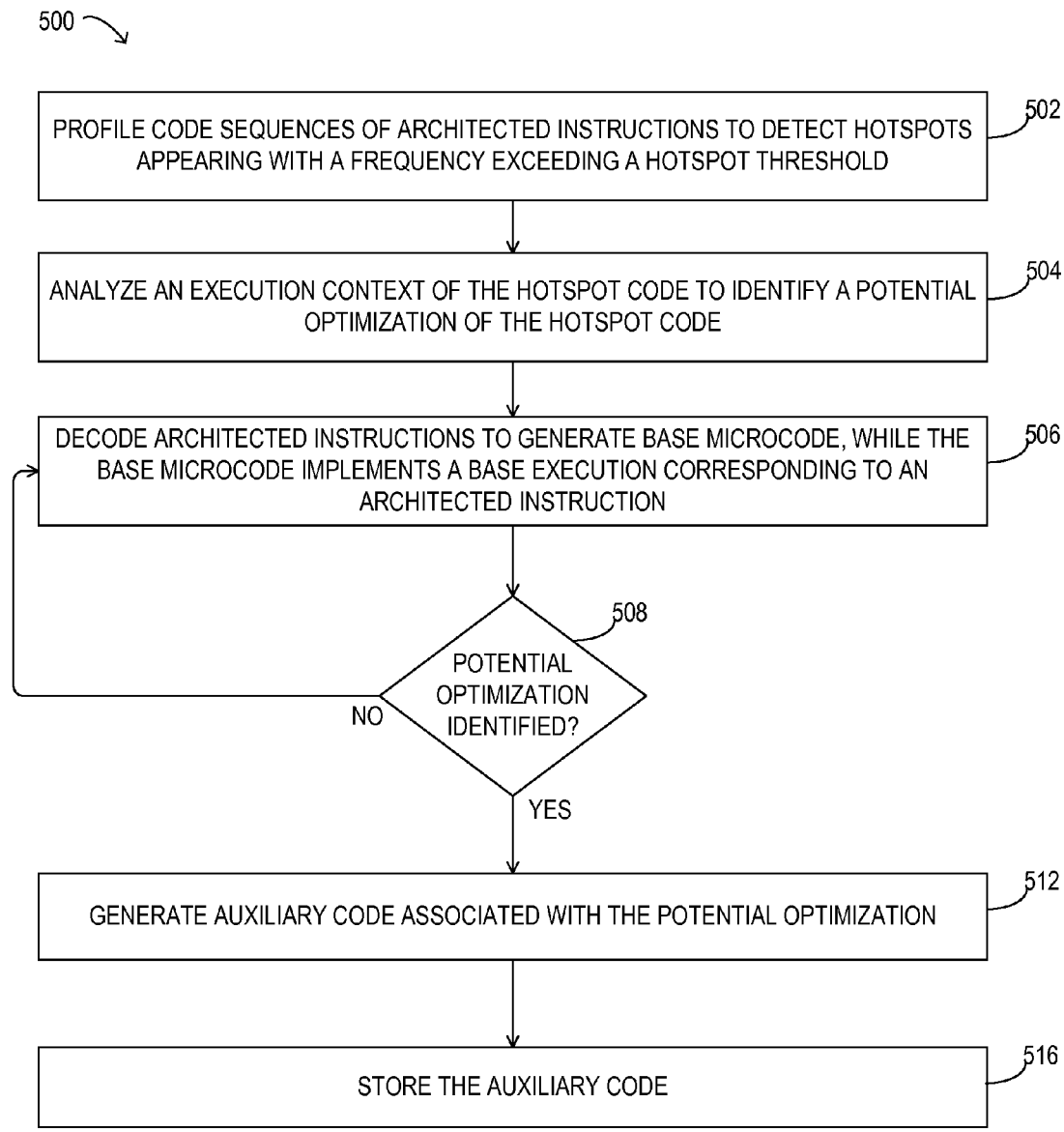
FIG. 5 illustrates one embodiment of an auxiliary code generation method.

FIG. 5 illustrates one embodiment of an auxiliary code generation method. In at least one embodiment, method 500 may be executed, at least in part, by processor 170, 200 including cores 174, 202 (see FIGS. 1, 2). In some embodiments, method 500 may begin by profiling (operation 502) code sequences of architected instructions to detect hotspots appearing with a frequency exceeding a hotspot threshold. In at least one embodiment, the code sequences may be profiled in operation 502 while being loaded onto a processor for execution. In some embodiments, an execution context of the hotspot code may be analyzed (operation 504) to identify a potential optimization of the hotspot code. In some embodiments, the architected instructions may be decoded (operation 506) to generate base microcode, which corresponds to a base execution of an architected instruction. In in some embodiments, a decision may then be made (operation 508) whether a potential optimization is identified. In at least one embodiment, when the result of operation 508 is NO, then method 500 may loop back to operation 506. When the result of operation 508 is YES, then auxiliary code associated with the potential optimization may be generated (operation 512) in some embodiments. In some embodiments, the auxiliary code may be stored (operation 516) in an auxiliary code store located within the core or concealed memory region.

Figure 6:
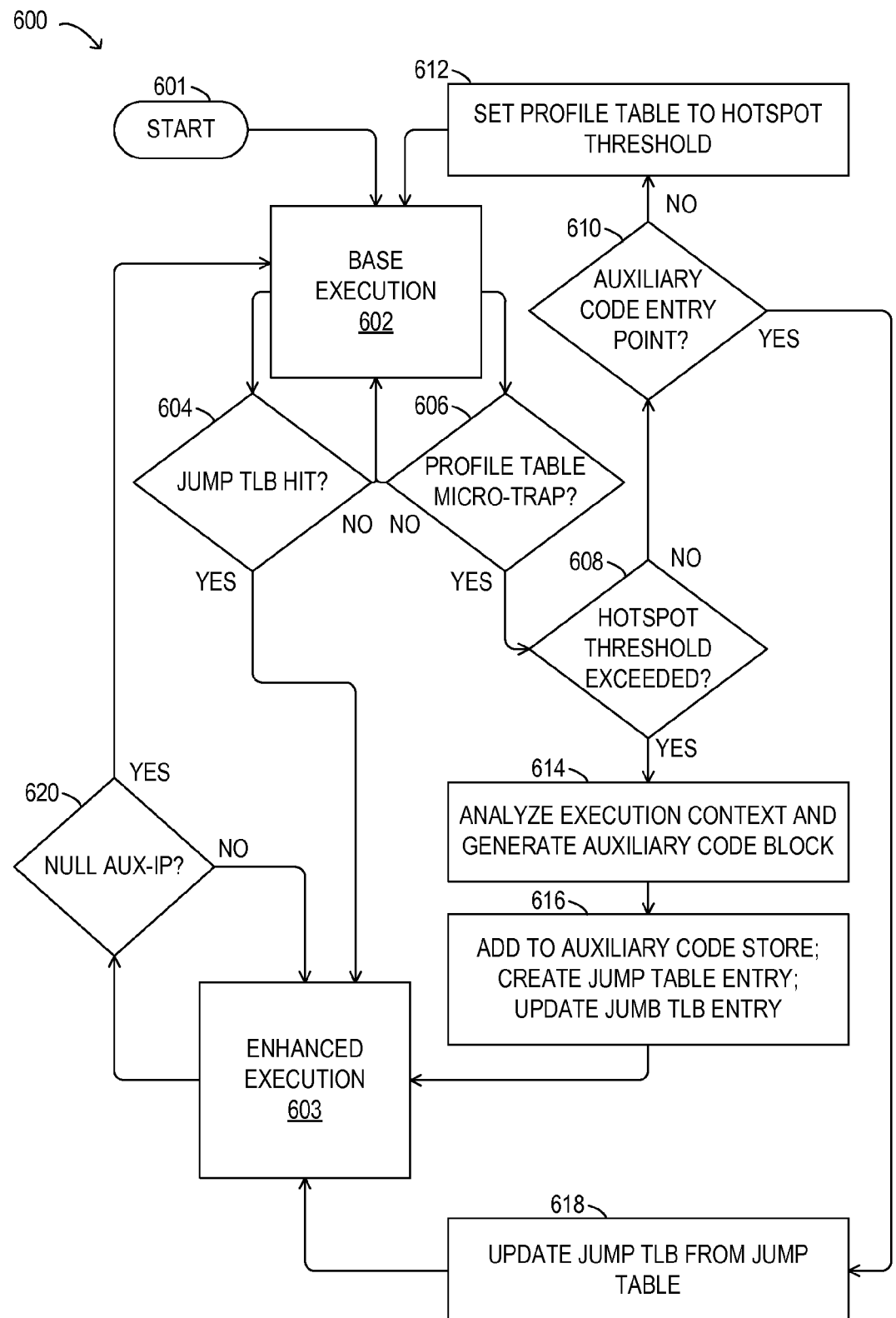
FIG. 6 illustrates one embodiment of an execution method employing auxiliary code.

FIG. 6 illustrates one embodiment of an execution method employing auxiliary code. In at least one embodiment, method 600 may be executed, at least in part, by processor 170, 200 including cores 174, 202 (see FIGS. 1, 2). In some embodiments, method 600 may begin by a start operation (operation 601). In some embodiments, operation 601 may represent an initial power up of a processor or a re-start after operation was previously interrupted. Upon startup, method 600 may, in some embodiments, proceed with base execution 602, representing an unmodified execution of architected instructions that does not rely upon auxiliary code, but uses base microcode. Accordingly, base execution 602 may, in some embodiments, be associated with certain inefficiencies, such as higher power consumption and/or suboptimal performance characteristics. In some embodiments, during base execution 602, profiling of architected instructions that are executed by the processor may be performed along with population of a profile table (see FIG. 3, profile table 330). In some embodiments, from base execution 602, a decision may be made (operation 606) whether a micro-trap in the profile table has been activated. The micro-trap may, in some embodiments, be indicative of a count value for an entry in the profile table exceeding a specified threshold. In some embodiments, when the result of operation 606 is NO, method 600 may return to base execution 602. In some embodiments, when the result of operation 606 is YES, a determination may be made (operation 608) whether a hotspot threshold was exceeded.

As illustrated by operations 606 and 608, in some embodiments, there may be two count thresholds supported by the profile table. The threshold in operation 608 may be a higher value that is used to identify code hotspots. The threshold in operation 606 may be a lower threshold for jump TLB management, as will be described in further detail below. In certain embodiments, auxiliary code handler 320 (see FIG. 3) may be invoked by the micro-trap and may perform region optimization and/or jump TLB management. To identify which threshold should be used for triggering the micro-trap at any given time, a corresponding bit in the profile table may be used in some embodiments.

In some embodiments, in method 600, when the result of operation 608 is NO, a determination may be made (operation 610) whether the triggered micro-trap corresponds to an auxiliary code entry point. The determination in operation 610 may, in some embodiments, evaluate whether a current instruction referenced by the architected IP is a jump instruction. In some embodiments, when the result of operation 610 is NO, then the profile table may be set (operation 612) to the hotspot threshold and execution may return to base execution 602. When the result of operation 610 is YES, then the jump TLB may, in some embodiments, be updated (operation 618) from the jump table. In some embodiments, when operation 618 is reached, auxiliary code corresponding to architected instructions currently being executed is available, and method 600 may proceed to enhanced execution 603.

In some embodiments, when the result of operation 608 is YES, then an execution context of the architected instructions currently being executed may be analyzed (operation 614) and an auxiliary code block may be generated (operation 614). In at least one embodiment, the auxiliary code may then be added (operation 616) to the auxiliary code store, a jump table entry may be created (operation 616), and a jump TLB entry may be updated (operation 616). Next, method 600 may, in some embodiments, proceed to enhanced execution 603 where the auxiliary code may be blended with base microcode. In some embodiments, the base microcode and the auxiliary code may be blended to produce enhanced microcode that specifies enhanced execution 603 for the architected instruction. In some embodiments, a number of operands in enhanced execution 603 may differ from a number of operands in base execution 602 and a number of functions performed by enhanced execution 603 may differ from a number of functions performed by base execution 602.

In some embodiments, from base execution 602, a decision may be made (operation 604) whether the architected IP address results in a hit in the jump TLB. When the result of operation 604 is NO, method 600 may, in some embodiments, return to base execution 602. In at least one embodiment, when the result of operation 604 is YES, auxiliary code corresponding to the architected IP address may be available, and method 600 may proceed to enhanced execution 603. In some embodiments, during enhanced execution 603, a decision may be made (operation 620) whether an auxiliary IP address refers to a null value. When the result of operation 620 is NO, method 600 may, in some embodiments, return to enhanced execution 603. In some embodiments, when the result of operation 620 is YES, then no auxiliary code corresponding to the currently executed architected instructions is available, so method 600 may return to base execution 602. In some embodiments, method 600 may be terminated or be interrupted (not shown) from base execution 602 or enhanced execution 603.

As described herein, enhanced (or modified) execution using auxiliary code may be implemented in embodiments having an out of order execution engine to achieve improved performance. Enhanced execution using auxiliary code, as presented herein, may also be used in low power applications that may employ an in-order execution engine.

The following pertain to further embodiments:

Embodiment 1 is a method to enhance code execution comprising: identifying, as a hotspot, a code sequence of architected instructions executing with a frequency exceeding a hotspot threshold; identifying an instance of an architected instruction in the hotspot to optimize, wherein the architected instruction corresponds to a set of base microcode operations; generating a set of auxiliary code operations corresponding to the base microcode operations associated with the architected instruction instance; and recording a mapping between the auxiliary code generated and the architected instruction instance.

In embodiment 2, the subject matter of embodiment 1 can optionally include retrieving the auxiliary code operations associated with the architected instruction instance; and blending base microcode and the auxiliary code retrieved to produce enhanced microcode, wherein the base microcode for an architected instruction corresponds to a first operation, and wherein the enhanced microcode corresponds to a second operation.

In embodiment 3, the blending included in the subject matter of embodiment 2 can optionally include appending one auxiliary code operation to one corresponding base microcode operation.

In embodiment 4, the auxiliary code and the base microcode included in the subject matter of embodiment 2 are optionally maintained in separate memory regions, and the blending included in the subject matter of embodiment 2 can optionally include invoking a jump table to identify an auxiliary code operation corresponding to a base code operation.

In embodiment 5, the operands in the modified execution included in the subject matter of embodiment 2 can optionally differ from operands in the base execution.

In embodiment 6, the number of operands in the enhanced microcode included in the subject matter of embodiment 5 can optionally differ from a number of operands in the base microcode.

In embodiment 7, a function performed by the enhanced microcode included in the subject matter of embodiment 2 can optionally differ from a function performed by the base microcode.

In embodiment 8, the number of functions performed by the enhanced microcode included in the subject matter of embodiment 7 can optionally differ from a number of functions performed by the base microcode.

In embodiment 9, the analyzing the execution context included in the subject matter of embodiment 1 can optionally include analyzing contextual information describing prior executions of the hotspot.

In embodiment 10, the contextual information included in the subject matter of embodiment 9 can optionally include at least one of: information indicating a likelihood of a branch path; information indicating a likelihood of an operand referencing a hardware structure; information indicating a likelihood of an operand referencing a memory address; information indicating a likelihood of an operand storing a given value; and information indicating a frequency of consumption of a result of an instruction.

Embodiment 11 is a processor comprising: a computer readable storage medium accessible to the processor, including processor executable instructions to cause the processor to: profile code sequences of architected instructions to detect hotspots appearing more frequently than a hotspot threshold; analyze an execution context of a hotspot included in the hotspots detected to identify a potential optimization corresponding to the hotspot; generate auxiliary code associated with the potential optimization; and store the auxiliary code.

In embodiment 12, the instructions included in the subject matter of embodiment 11 can optionally include instructions to cause the processor to: retrieve the auxiliary code associated with the potential optimization; and blend base microcode with the auxiliary code retrieved to produce enhanced microcode, wherein the base microcode for an architected instruction specifies a base execution of the architected instruction, and wherein the enhanced microcode specifies an enhanced execution for the architected instruction.

In embodiment 13, the executing the base execution included in the subject matter of embodiment 12 can optionally consumer more power than executing the enhanced execution.

In embodiment 14, performance of the base execution included in the subject matter of embodiment 12 can optionally be lower than a performance of the enhanced execution.

In embodiment 15, the instructions to analyze the execution context included in the subject matter of embodiment 13 can optionally include instructions to store contextual information describing prior executions of the hotspot.

In embodiment 16, the contextual information included in the subject matter of embodiment 15 can optionally include at least one of: information indicating a likelihood of a branch path; information indicating a likelihood of an operand referencing a hardware structure; information indicating a likelihood of an operand referencing a memory address; information indicating a likelihood of an operand storing a given value; and information indicating a frequency of consumption of a result of an instruction.

Embodiment 17 is a computer system comprising: a processor comprising a first core; and a memory accessible to the processor, wherein the first core includes instructions executable by the first core to: profile code sequences of architected instructions to detect hotspot code appearing more frequently than a hotspot threshold; analyze an execution context of the hotspot code to identify a potential optimization of the hotspot code; generate auxiliary code associated with the potential optimization; and store the auxiliary code.

In embodiment 18, the first core included in the subject matter of embodiment 17 can optionally retrieve the auxiliary code associated with the potential optimization; and blend base microcode with the auxiliary code retrieved to produce enhanced microcode, wherein the base microcode for an architected instruction specifies a base execution of the architected instruction, and wherein the enhanced microcode specifies an enhanced execution for the architected instruction.

In embodiment 19, the first core included in the subject matter of embodiment 17 can optionally include a jump table that indexes hotspot code to corresponding auxiliary code; and a jump translation lookaside buffer to cache entries in the jump table.

In embodiment 20, the first core included in the subject matter of embodiment 17 can optionally include an auxiliary code handler to blend the base microcode with the auxiliary code.

In embodiment 21, the first core included in the subject matter of embodiment 17 can optionally include: a base microcode store; and an auxiliary code store.

In embodiment 22, the instructions to analyze the execution context included in the subject matter of embodiment 17 can optionally include instructions to store contextual information describing prior executions of the hotspot.

In embodiment 23, the contextual information included in the subject matter of embodiment 22 can optionally include at least one of: information indicating a likelihood of a branch path; information indicating a likelihood of an operand referencing a hardware structure; information indicating a likelihood of an operand referencing a memory address; information indicating a likelihood of an operand storing a given value; and information indicating a frequency of consumption of a result of an instruction.

In embodiment 24, the analyzing the execution context included in the subject matter of any one of embodiments 1-8, can optionally include analyzing contextual information describing prior executions of the hotspot.

In embodiment 25, the first core included in the subject matter of any one of embodiments 17-18 can optionally include a jump table that indexes hotspot code to corresponding auxiliary code; and a jump translation lookaside buffer to cache entries in the jump table.

In embodiment 26, the first core included in the subject matter of any one of embodiments 17-19 can optionally include an auxiliary code handler to blend the base microcode with the auxiliary code.

In embodiment 27, the instructions to analyze the execution context included in the subject matter of any one of embodiments 17-21 can optionally include instructions to store contextual information describing prior executions of the hotspot.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method to enhance code execution, the method comprising:
    identifying, as a hotspot, a code sequence of architected instructions executing with a frequency exceeding a hotspot threshold;
    identifying an instance of an architected instruction in the hotspot to optimize, wherein the architected instruction corresponds to a set of base microcode operations;
    generating a set of auxiliary code corresponding to the base microcode operations associated with the architected instruction instance, including blending base microcode of the base microcode operations and auxiliary code associated with the architected instruction instance to produce enhanced microcode, including appending an auxiliary code operation to a corresponding base microcode operation, wherein the base microcode for the architected instruction instance corresponds to a first operation and the enhanced microcode corresponds to a second operation; and
    recording a mapping between the set of auxiliary code and the architected instruction instance.

2. The method of claim 1, wherein the auxiliary code and the base microcode are maintained in separate memory regions, and wherein blending includes invoking a jump table to identify an auxiliary code operation corresponding to a base code operation.

3. The method of claim 1, wherein operands in the modified execution differ from operands in the base execution.

4. The method of claim 3, wherein a number of operands in the enhanced microcode differs from a number of operands in the base microcode.

5. The method of claim 1, wherein a function performed by the enhanced microcode differs from a function performed by the base microcode.

6. The method of claim 5, wherein a number of functions performed by the enhanced microcode differs from a number of functions performed by the base microcode.

7. The method of claim 1, further comprising analyzing the code sequence of executed instructions to obtain contextual information describing an execution context of the executed instructions.

8. The method of claim 7, wherein the contextual information includes at least one of:
    information indicating a likelihood of a branch path;
    information indicating a likelihood of an operand referencing a hardware structure;
    information indicating a likelihood of an operand referencing a memory address;
    information indicating a likelihood of an operand storing a given value; and
    information indicating a frequency of consumption of a result of an instruction.

9. A processor, comprising:
    a microcode storage to store base microcode;
    an auxiliary code store to store auxiliary code, the auxiliary code store concealed from and transparent to system software;
    a blender coupled to the auxiliary code store and the base microcode storage to form enhanced microcode;
    an execution unit to execute instructions stored in a non-transitory computer readable storage medium accessible to the processor, including processor executable instructions to cause the processor to:
        profile code sequences of architected instructions to detect hotspots appearing more frequently than a hotspot threshold;
        analyze an execution context of a hotspot included in the hotspots detected to identify a potential optimization corresponding to the hotspot;
        generate auxiliary code associated with the potential optimization, including to append an auxiliary code operation to a corresponding base microcode operation to blend base microcode with auxiliary code to form enhanced microcode, wherein the base microcode for an architected instruction of the hotspot corresponds to a first operation and the enhanced microcode corresponds to a second operation; and
        store the auxiliary code.

10. The processor of claim 9, wherein the instructions include instructions to cause the processor to:
    retrieve the auxiliary code associated with the potential optimization; and
    wherein the base microcode for the architected instruction specifies a base execution of the architected instruction, and wherein the enhanced microcode specifies an enhanced execution for the architected instruction.

11. The processor of claim 10, wherein execution of the base microcode is to consume more power than execution of the enhanced microcode.

12. The processor of claim 10, wherein a performance of the base microcode is lower than a performance of the enhanced execution.

13. The processor of claim 11, wherein the instructions to analyze the execution context include instructions to:
    store contextual information describing prior executions of the hotspot.

14. The processor of claim 13, wherein the contextual information includes at least one of:
    information indicating a likelihood of a branch path;
    information indicating a likelihood of an operand referencing a hardware structure;
    information indicating a likelihood of an operand referencing a memory address;
    information indicating a likelihood of an operand storing a given value; and
    information indicating a frequency of consumption of a result of an instruction.

15. A computer system comprising:
a processor comprising a first core; and
a memory accessible to the processor, wherein the first core includes instructions executable by the first core to:
profile code sequences of architected instructions to detect hotspot code appearing more frequently than a hotspot threshold;
analyze an execution context of the hotspot code to identify a potential optimization of the hotspot code;
generate auxiliary code associated with the potential optimization, including to append an auxiliary code operation to a corresponding base microcode operation to blend base microcode with auxiliary code to form enhanced microcode, wherein the base microcode for an architected instruction of the hotspot code corresponds to a first operation and the enhanced microcode corresponds to a second operation; and
store the auxiliary code.

16. The system of claim 15, wherein the first core is to:
retrieve the auxiliary code associated with the potential optimization; and
wherein the base microcode for an architected instruction specifies a base execution of the architected instruction, and wherein the enhanced microcode specifies an enhanced execution for the architected instruction.

17. The system of claim 15, wherein the first core includes:
a jump table that indexes hotspot code to corresponding auxiliary code; and
a jump translation lookaside buffer to cache entries in the jump table.

18. The system of claim 15, wherein the first core includes:
an auxiliary code handler to blend the base microcode with the auxiliary code.

19. The system of claim 15, wherein the first core includes:
a base microcode store; and
an auxiliary code store.

20. The system of claim 15, wherein the instructions to analyze the execution context include instructions to:
store contextual information describing prior executions of the hotspot.

21. The system of claim 20, wherein the contextual information includes at least one of:
information indicating a likelihood of a branch path;
information indicating a likelihood of an operand referencing a hardware structure;
information indicating a likelihood of an operand referencing a memory address;
information indicating a likelihood of an operand storing a given value; and
information indicating a frequency of consumption of a result of an instruction.

22. The method of claim 1, further comprising storing the enhanced microcode in an enhanced execution memory region, the enhanced execution memory region within a core of a processor and transparent to system software.

23. The processor of claim 9, wherein the blender is to synchronize a stream of the auxiliary code with a stream of the base microcode.

* * * * *

UNITED STATES PATENT AND TRADEMARK OFFICE
CERTIFICATE OF CORRECTION

PATENT NO. : 9,342,303 B2  
APPLICATION NO. : 13/843940  
DATED : May 17, 2016  
INVENTOR(S) : James E. Smith et al.

Page 1 of 1

It is certified that error appears in the above-identified patent and that said Letters Patent is hereby corrected as shown below:

In the claims,  
Column 15, line 27, delete "to enhance code execution, the method".

Signed and Sealed this  
Twenty-sixth Day of July, 2016

Michelle K. Lee  
*Director of the United States Patent and Trademark Office*